Figure 1:
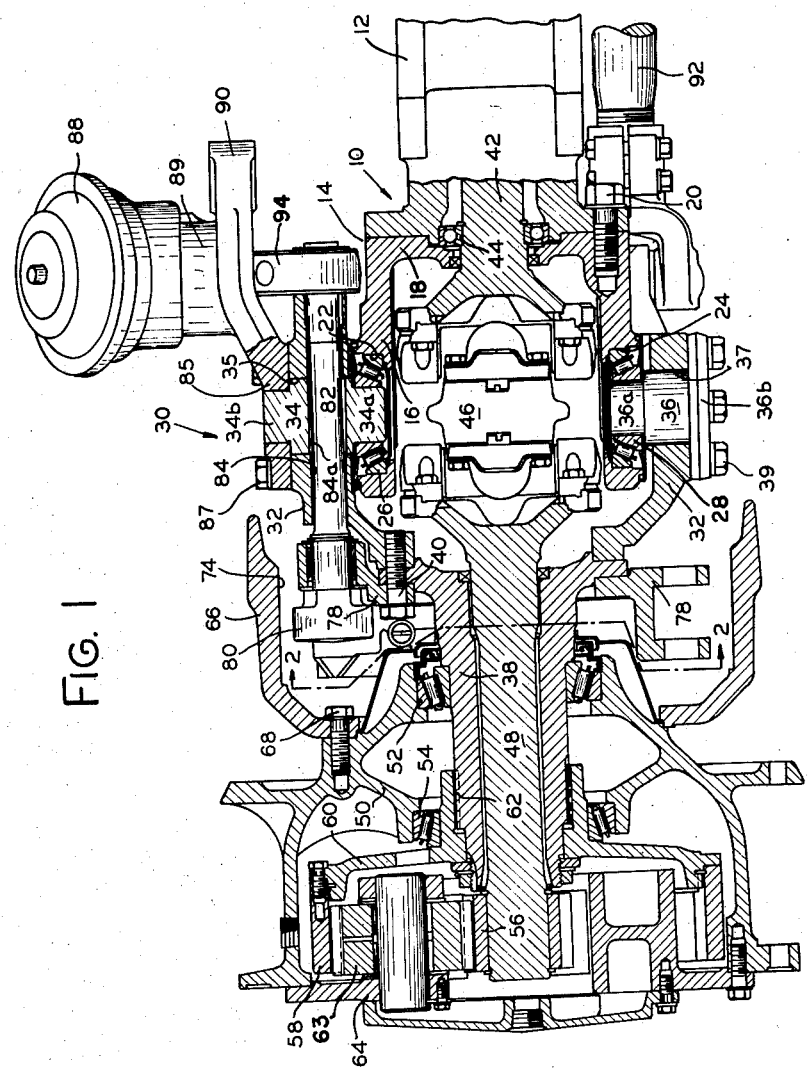

Feb. 3, 1959    M. E. DREITZLER    2,871,966
STEERING DRIVE AXLE

Filed Dec. 26, 1956    2 Sheets-Sheet 1

INVENTOR.
MELVIN E. DREITZLER
BY
ATTY.

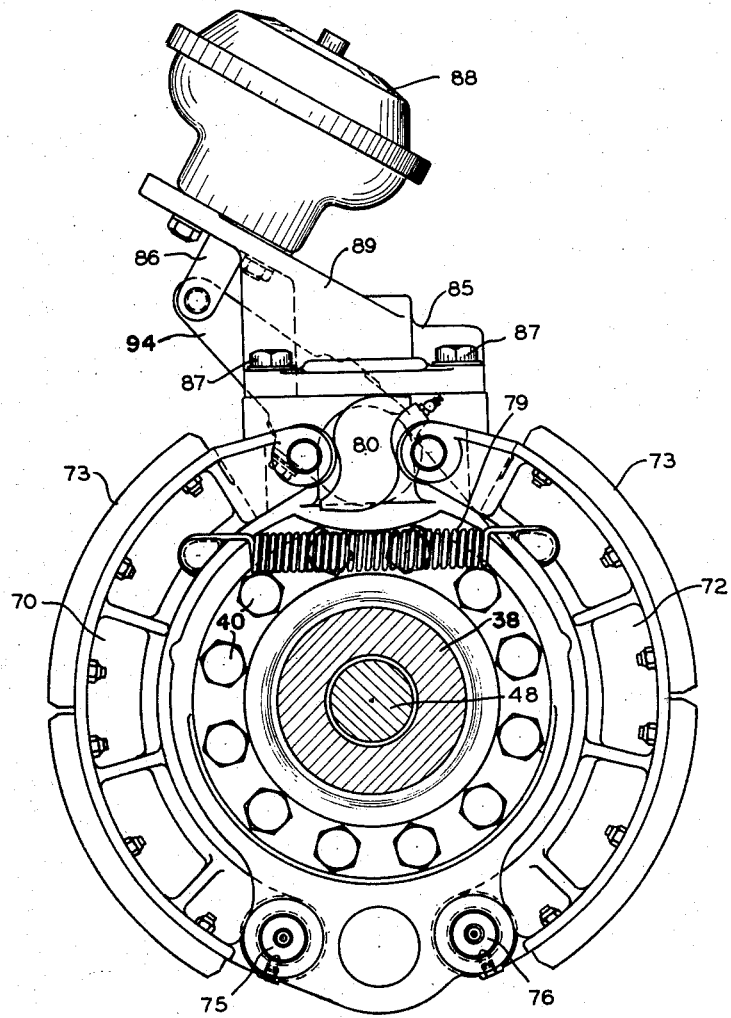

United States Patent Office 2,871,966
Patented Feb. 3, 1959

2,871,966

STEERING DRIVE AXLE

Melvin E. Dreitzler, Buchanan, Mich., assignor to Clark Equipment Company, a corporation of Michigan Application December 26, 1956, Serial No. 630,499

2 Claims. (Cl. 180—43)

This invention relates to driven steering axles for vehicles and more particularly to driven steering axles of the full floating type.

The primary object of the present invention is to provide a compact and rugged mechanism for a steering and driving axle composed of parts which are readily manufactured and assembled.

A more specific object of the invention is to provide an improved arrangement for the brake and brake operating mechanism for a steering drive axle.

In carrying out my invention in one form I provide a fixed axle housing with a movable housing pivotally mounted thereon. A brake is mounted on the movable housing, a shaft for operating the brake extends through an aperture in the movable housing, and the operating mechanism for the brake is mounted on the movable housing and connected to the shaft.

For a clearer and more complete understanding of my invention reference should be had to the accompanying drawing in which Figure 1 is a sectional view through the axis of one end of a steering drive axle embodying the present invention, while Figure 2 is an enlarged sectional view along the line 2—2 of Figure 1.

Referring to Figure 1 of the drawing, I have indicated generally by the numeral 10 an end portion of a nonrotatable or fixed axle housing having a pad part 12 thereon by means of which the housing may be secured to the frame of a vehicle. The fixed housing 10 also includes an outwardly projecting extension 14 composed of a cylindrical portion 16 and a radially inwardly disposed portion 18. Extension 14 is secured to housing 10 to form a unitary fixed housing structure in a suitable manner such as by a plurality of capscrews 20 (only one of which appears in the drawing).

Portion 16 of the fixed housing is provided at the top and bottom with a pair of circular openings 22 and 24 respectively. Located in these openings are a pair of anti-friction bearings 26 and 28 respectively which in this typical case are tapered roller bearings. These anti-friction bearings comprise the usual inner and outer races, intervening tapered rollers and seals.

Pivotally mounted on the portion 16 of the fixed housing is a movable housing member indicated generally by the numeral 30. The movable housing 30 includes a trunnion or spindle carrying portion 32 which carries a pair of trunnion members 34 and 36 located in circular openings 35 and 37 at the top and bottom repectively. These members have trunnions 34a and 36a extending into the bearings 26 and 28. Trunnion member 34 has an upwardly extending portion 34b of reduced diameter which extends into a cap or bracket member 85 which is described in greater detail hereinafter. Member 85 is connected to movable housing portion 32 by means of capscrews 87. Cap member 85 holds trunnion member 34 in position due to the abutment of member 85 against the shoulder formed on member 34 adjacent the connection of reduced diameter portion 34b to the main body portion of the trunnion member. Trunnion member 36 has a flange portion 36b which is bolted to the bottom part of housing portion 32 by means of a plurality of capscrews 39. It will be understood that in assembling the movable portion of the housing on the fixed portion that trunnion 34a is first put into position in bearing 26. Next, trunnion member 36 is inserted into opening 37 with trunnion 36a being simultaneously inserted in its bearing 28, and then capscrews 39 are then put into place. The movable housing 30 also includes a sleeve or spindle portion 38 which is secured to the housing portion 32 to form a unitary movable housing structure in a suitable manner such as by a plurality of capscrews 40.

A main axle shaft 42 is located within the fixed housing 10 and is supported near its outer end by anti-friction bearing 44 which in this case is a ball bearing. Axle shaft 42 is connected by means of a double universal joint 46 of known construction to a stub shaft 48 which is located within sleeve portion 38 of the movable axle housing. It will be understood that the double universal joint 46 provides for the rotation of stub shaft 46 by shaft 42 at approximately the same velocity even though the movable axle housing and stub shaft 48 pivot about a vertically disposed axis through trunnion portions 34 and 36 during steering.

A wheel hub 50 is rotatably mounted on sleeve portion 38 by means of an inner anti-friction bearing 52 shown here as a tapered roller bearing and an outer anti-friction bearing 54 also shown as a tapered roller bearing.

Shaft 48 is arranged to rotate wheel hub 50 through an intervening planetary gear mechanism which includes a sun gear 56 mounted adjacent the end of shaft 48 and a ring gear 58 which is fixed to sleeve portion 38 by means of an intervening member 60 and a spline connection at 62. The planetary gearset includes also a plurality of planetary gears 63 (only one of which is visible in Figure 1) which are in mesh with the sun gear 56 and the ring gear 58 and are carried on a planet carrier 64 which in turn is connected to the wheel hub 50. With this arrangement rotation of axle shaft 48 and sun gear 56 causes the planet carrier 64 to rotate in the same direction but at a slower speed which is dependent upon the tooth ratios of the sun, ring and planetary gears.

The braking means for the disclosed steering drive axle comprises a brakedrum 66 which is connected in a suitable manner such as by a plurality of capscrews 68 (one of which appears in the drawing) to the wheel hub 50.

Referring to Figure 2 of the drawing, the brake means also include two shoes 70 and 72 having friction lining material 73 on the outer arcuate surfaces thereof for engagement of the inner cylindrical surface 74 of the drum 66. The shoes are pivotally mounted at 75 and 76 respectively on anchor pins which are carried by a backing plate 78 (see Figure 1). Backing plate 78 is connected to the movable housing 30 by means of screws 40. A return spring 79 is provided for the shoes in the usual manner. The brake shoes are actuated by means of a cam member 80 mounted on a cam shaft 82 which extends through a suitable aperture 84 in the upper part of movable housing portion 32 and an aligned aperture 84a in trunnion member 34. The axis of shaft 82 intersects the vertically disposed axis of trunnions 34 and 36 in this typical construction. At the opposite or inner end of shaft 82 a lever or arm 94 is mounted thereon and arm 94 is connected to the operating rod 86 of a diaphragm type air actuator or motor which is denoted generally by the numeral 88. Actuator 88 (which may be, for example, a Bendix-Westinghouse type 36 brake chamber as shown in Bendix-Westinghouse Automotive Air Brake Co. Catalog of Air Brake Equipment, Catalog 5-36-2, dated October, 1954) is mounted on a bracket portion 89 which is formed integrally with cap member 85.

In operation, rotation of shaft 42 rotates stub shaft 48 through the intervening universal joint which, in turn, rotates the wheel through the planetary gear mechanism. It will be readily appreciated, of course, that the complete mechanism described and illustrated herein is duplicated at the other end of the axle and that there is preferably an intervening differential mechanism to which the propeller shaft of the vehicle is connected in the usual manner. The wheel (not shown) which is mounted on hub 50 is steered by movement of lever 90 which is also formed integrally with cap member 85 and thus is connected to the upper part of movable housing portion 32. Movement of lever 90 through a radius or steering rod connected to the steering mechanism of the vehicle pivots movable housing 32 together with the wheel and brake mechanism mounted thereon about the vertically disposed axis through trunnions 34 and 36. A tie rod 92 connects the movable housing illustrated herein to a corresponding mechanism at the opposite end of the axle in the customary manner, for steering the opposite wheel.

To apply the brake, actuator 88 is actuated to pivot lever 94 and rotate cam shaft 82 sufficiently that the cam member 80 forces the brake shoes into engagement with the brake drum 66.

The structure of this invention is composed of parts which are relatively easy to manufacture and assemble and it provides a more compact structure than the comparable prior art steering drive axles of which I am aware. It will be appreciated by those familiar with axles of this type and with the machines in which they are used that space is almost always at a premium for steering drive axles. The passing of the cam shaft for the brake through and the mounting of the brake actuator on the movable housing are especially helpful in achieving compactness and good operation.

While I have illustrated and described herein a preferred embodiment of my invention it will be understood that modifications may be made. I intend to cover by the appended claims all such modifications falling within the true spirit and scope of my invention.

I claim:

1. A steering drive axle comprising, a fixed housing having an enlarged extension portion at the end thereof, the said extension portion having a first pair of circular openings therein at the top and bottom, a movable housing pivotally mounted on the said fixed housing, said movable housing having a second pair of circular openings through top and bottom portions thereof, a pair of trunnion members located respectively in the said second pair of openings and having portions extending respectively into the said first pair of openings, a cap member mounted on the top of the said movable housing for holding the uppermost trunnion member in position, an outwardly extending central sleeve portion on the said movable housing, a wheel hub mounted for rotation on the said sleeve portion, a brake drum located between the said cap member and the said wheel hub, that is, axially outwardly of the cap member and axially inwardly of the wheel hub, brake shoes mounted on the said movable housing and arranged to engage the inner surface of the said brake drum, connections between the said brake drum and the said wheel hub located axially outwardly of the said inner surface, and an operating cam for the said brake shoes, the said movable housing and the said uppermost trunnion member having longitudinally disposed axially aligned apertures extending therethrough, a shaft for operating the said brake mechanism extending through the said apertures and having the said cam mounted on one end thereof, an actuator for the said brake mechanism mounted on the said cap member, and a lever mounted on the other end of the said shaft and connected to the said actuator.

2. In a steering drive axle, an axle shaft, a wheel driving stub shaft, a universal joint flexibly connecting the said shafts, a fixed axle housing surrounding the first mentioned shaft, a housing for said universal joint comprising an enlarged extension portion connected to the said fixed axle housing, the said extension portion having a first pair of circular openings therein at the top and bottom, a movable housing pivotally mounted on the said fixed housing by means of a trunnion connection comprising a second pair of circular openings in the said movable housing and a pair of trunnion members aligned axially along a vertically disposed axis and extending respectively into one each of the said first and second pairs of openings, a sleeve portion of the said movable housing surrounding the said stub shaft, a wheel hub mounted for rotation on the said sleeve portion, a brake drum located between the said trunnion members and the said wheel hub, that is, axially outwardly of the trunnion members and axially inwardly of the wheel hub, brake shoes mounted on the said movable housing and arranged to engage an inner surface of the said brake drum, connections between the said brake drum and the said wheel hub located axially outwardly of the said inner surface, an operating cam for the said brake shoes, the said movable housing and the uppermost trunnion member having aligned longitudinally disposed apertures therethrough, the aperture through the said uppermost trunnion member intersecting the said vertically disposed axis through the aligned trunnion members, a shaft for operating the said brake shoes extending through the said apertures and having the said cam mounted on one end thereof, an actuator for the said brake shoes mounted on the said movable housing, and a lever mounted in the other end of the said shaft and connected to the said actuator.

References Cited in the file of this patent

UNITED STATES PATENTS

| 1,922,962 | Lambert | Aug. 15, 1933 |
| 2,051,474 | Ford | Aug. 18, 1936 |
| 2,598,876 | Ash | June 3, 1952 |

FOREIGN PATENTS

| 517,465 | Great Britain | Jan. 31, 1940 |
| 750,739 | Great Britain | June 20, 1956 |

(Corresponding U. S., 2,801,702, Aug. 6, 1957.)